Jan. 5, 1926.

A. S. HOWELL 1,568,067

PHOTOGRAPHIC FILM MAGAZINE

Filed July 29, 1922    3 Sheets-Sheet 1

Inventor
Albert S. Howell
By Miehle & Miehle,
   Att'ys.

Jan. 5, 1926.

A. S. HOWELL 1,568,067

PHOTOGRAPHIC FILM MAGAZINE

Filed July 29, 1922

Inventor
Albert S. Howell
By Miehle & Miehle
Att'ys.

Jan. 5, 1926.
A. S. HOWELL
PHOTOGRAPHIC FILM MAGAZINE
Filed July 29, 1922  3 Sheets-Sheet 3
1,568,067
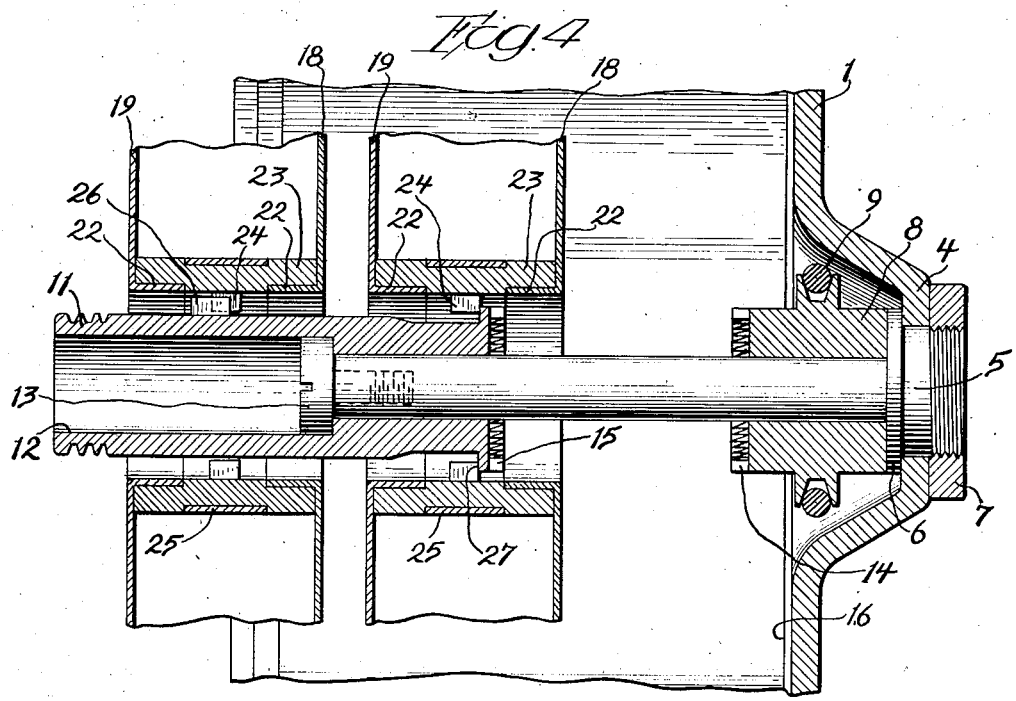
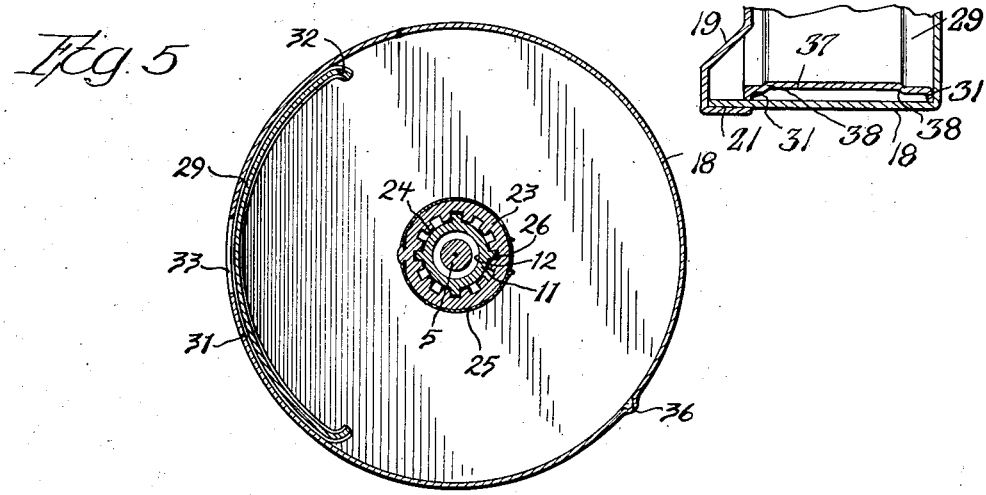
Inventor
Albert S. Howell
By Miehle + Miehle
attys.

Patented Jan. 5, 1926.

1,568,067

UNITED STATES PATENT OFFICE.

ALBERT S. HOWELL, OF CHICAGO, ILLINOIS, ASSIGNOR TO BELL & HOWELL COMPANY, OF CHICAGO, ILLINOIS, A CORPORATION OF ILLINOIS.

PHOTOGRAPHIC-FILM MAGAZINE.

Application filed July 29, 1922. Serial No. 578,444.

*To all whom it may concern:*

Be it known that I, ALBERT S. HOWELL, a citizen of the United States, residing at Chicago, in the county of Cook and State of Illinois, have invented a certain new and useful Improvement in Photographic-Film Magazines, of which the following is a full, clear, concise, and exact description, reference being had to the accompanying drawings, forming a part of this specification.

The features of my invention relate to a photographic film magazine of the type used in carrying the sensitized film in motion picture cameras which is simple in structure and provides for the driving of the film spool thereof and the feeding of the film into or out of the magazine, and which provides against light entering the magazine and exposing the film therein.

With these features in view my invention consists in certain features of novelty in the construction, combination, and arrangement of parts by which the said features and certain other features hereinafter appearing are effected, all as fully described with reference to the accompanying drawings and more particularly pointed out in the claims.

In the said drawings—

Figure 4 is an enlarged partial section similar to Fig. 2 showing parts in different positions from those shown in Fig. 2.

Figure 5 is a partial section taken on the line 5—5 of Fig. 2.

Figure 6 is an enlarged partial section of one of the film magazines taken on an axial plane thereof.

Like characters of reference indicate like parts in the various views.

Figure 2:
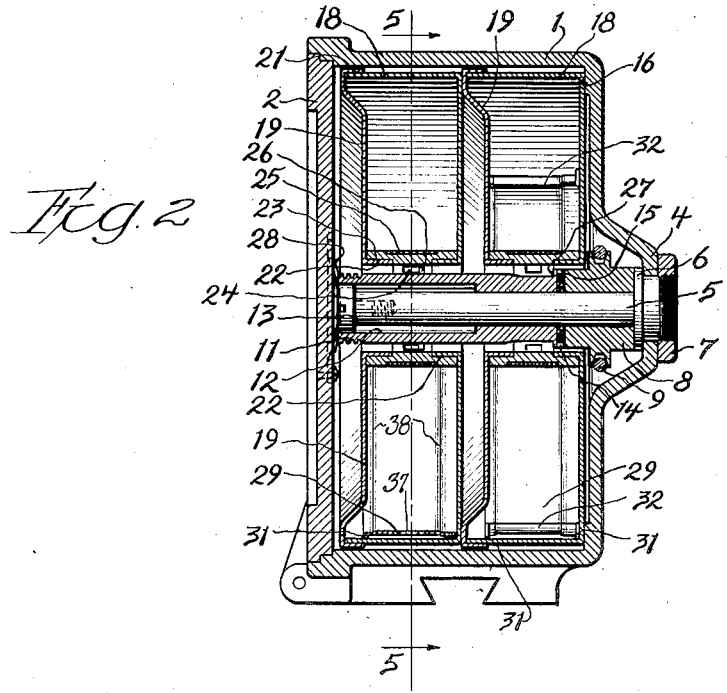
Figure 2 is a section taken on the line 2—2 of Fig. 1.

In the said drawings 1 designates a frame forming an enclosure open at one side. The open side of the frame is closed by a cover 2 releasably secured in closed position in a usual manner. The rear end of the frame is semicircularly formed as designated at 3, on a transverse horizontal axis, and the side wall of the frame has an outwardly displaced portion 4 disposed on said axis. A centrally disposed spindle 5 is disposed on the axis of the semicircularly formed portion 3 of the frame and extends from a point adjacent the open side of the frame within the enclosure thereof inwardly through a central bore in the displaced portion of the side wall of the frame. The spindle is secured at its inner end to the displaced portion 4 of the side wall of the frame by a flange 6 on the spindle disposed on the inside of the side wall and a nut 7 screwthreaded on the adjacent end of the spindle and clamping the side wall of the frame between it and the flange 6 of the spindle. A concentrically bored driving pulley 8 is rotatably mounted on the spindle 6 adjacent its inner end within the enclosure of the frame with its one end against the flange 6, and is driven by a belt 9 engaged with the groove thereof. A concentrically bored cylindrical member 11 extends along and is mounted for rotation and for axial movement on the spindle 6 outwardly of the pulley 8, and has the portion of its bore, extending inwardly from its outer end, enlarged, as designated at 12, and engaged for rotation and axial movement on the head of a screw 13 screwthreaded into the outer end of the spindle 6 in concentric relation therewith. The outwardly facing shoulder formed in the bore of the member 11 by the enlarged bore portion 12 thereof is adapted to engage the head of the screw 13 to limit outward movement of the member 11 as shown in Fig. 4. The pulley 8 is provided with outwardly facing clutch teeth 14, and the member 11 is provided with inwardly facing clutch teeth 15 engageable with the teeth 14 when the member 11 is at the inner end of its movement whereby it is driven by the pulley. The cover 2 when in closed position, as shown in Fig. 2, prevents outward movement of the member 11 from the inner end of its axial movement and thus maintains the member 11 in engagement with the pulley 8 to be driven thereby.

The frame 1 is provided with an outwardly facing film magazine seat 16 disposed inwardly of the open side thereof, and is adapted to receive a pair of identical circular film magazines through said open side and to contain the same in superposed coaxial relation disposed facewise with respect the open side and with the inner magazine against said seat. These magazines snugly fit the internal surface of the internal semicircular surface of the wall portion 3 of the frame which surface is extended by a rib 17 of the frame to maintain the magazines against edgewise movement and coaxial with the member 11. The body of each magazine comprises a circular sheet metal cup member 18 and a circular flanged sheet metal cover 19 having its flange detachably engaged with the lip of the cup member as designated at 21. The parallel walls of the cover and cup members of each magazine have the metal thereof at their centers displaced to form axial openings, into which the member 11 extends, and the metal so displaced is formed into coaxial cylindrical flanges 22 extending inwardly toward each other with their adjacent ends spaced. These flanges 22 are disposed coaxially with the member 11, and a concentrically bored film spool 23 is disposed between the parallel walls of each magazine and surrounds respective flanges 22 and is rotatably mounted thereon. These spools have intermediately disposed, internal, and toothed flanges 24 formed in the bores thereof, which flanges extend through the space between the flanges 22 of the magazines for the driving of the spools from the exterior of the magazine. The spools have spring clips 25 on the exterior surfaces thereof for holding the end of a film for winding the same thereon, these clips extending in both directions around the spools for winding a film in either direction thereon. The member 11 has an external tooth formation 26 thereon adapted to engage teeth of the toothed flange of the spool of the outer magazine to drive the same, the spool of the inner magazine being free to permit unwinding of the film therefrom.

The member 11 is provided with an outwardly facing shoulder 27 engageable with the inner face of the flange 24 of the spool of the inner magazine to move the magazines outwardly to a position where they may be conveniently grasped for removal as shown in Fig. 4.

The magazines are maintained against axial movement with the inner magazine against the seat 16 by springs 28 mounted on the inner surface of the cover 2 and pressing against the marginal edge of the cover 19 of the outer magazine when the cover is in closed position.

A curved wall member 29 is disposed on the inside of the curved cylindrical wall of each cup member 18 of the magazines and extends in a direction around the internal surface of said cylindrical wall, and is provided with longitudinal flanges 31 at its curved edges which are secured to the cylindrical wall to form with the cylindrical wall a curved light tight film passage extending in a direction around the axis of the magazine. See Figs. 2 and 5. The passage so formed is open at both ends to form film openings communicating with the interior of the magazines, and the ends of the wall member 29 are curved inwardly away from the cylindrical wall of the cup member 18, as designated at 32, to prevent sharp bends in the film. The cylindrical wall of the cup member 18 has a film opening 33 therein intermediate the ends of the wall member 36 and communicating with the film passage. A film may be fed into or out of the enclosure of the film magazine by means of the opening 33 and either one of the end openings of the film passage whereby the film may be wound on or unwound from the film in either direction thus obviating the necessity of right and left hand magazines.

The intermediate longitudinal portions of the wall members 29, as designated at 37, are offset, as designated at 38, inwardly from the longitudinal edge portions thereof whereby to prevent scratching of the intermediate longitudinal or picture portion of a film passing through the passages, the film tending to engage the inner wall surfaces of the passages in passing therethrough. See Figs. 2 and 6.

Figure 1:
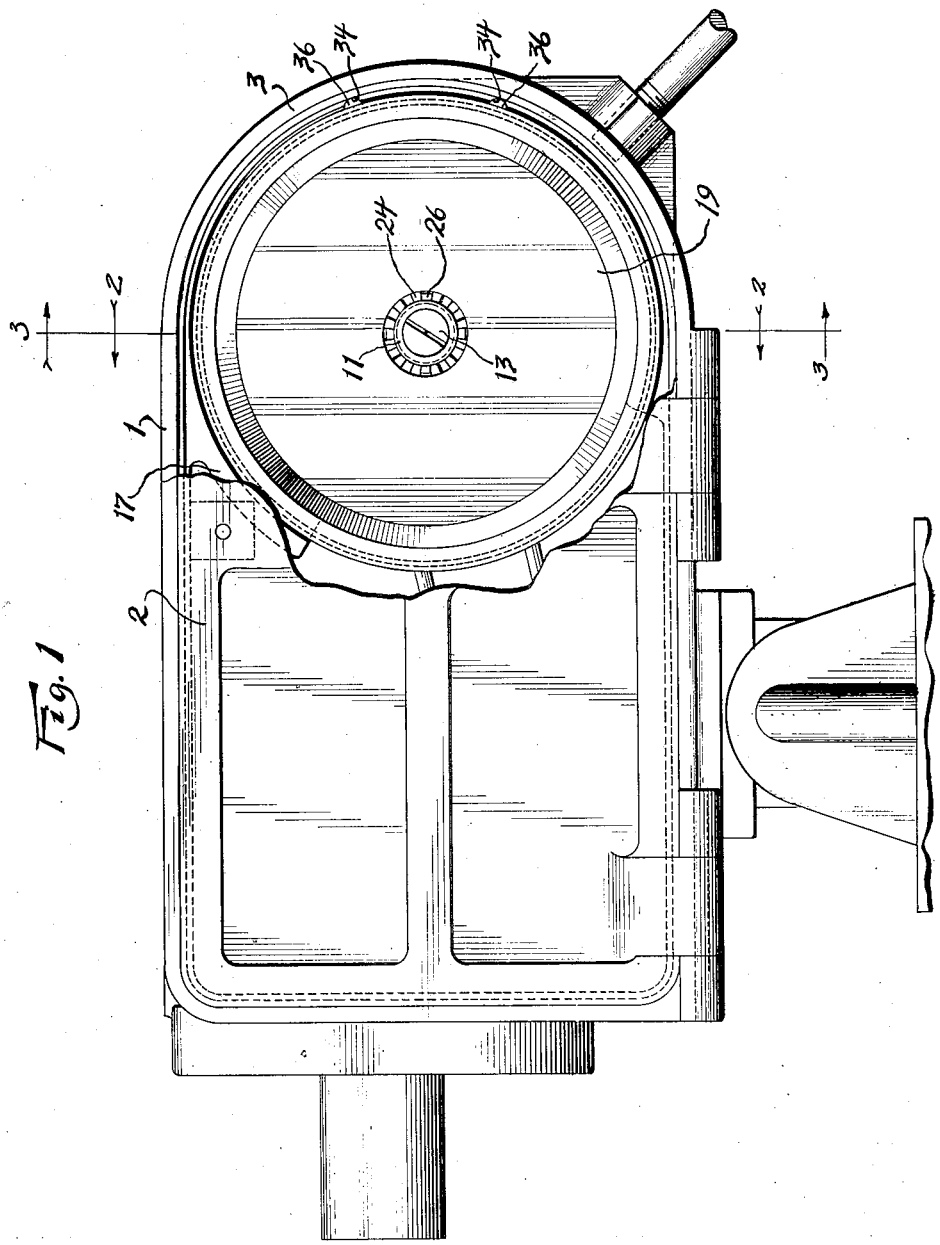
Figure 1 is a side elevation of a motion picture camera embodying the features of my invention and shown with the rear end of the removable cover thereof broken away.
Figure 3:
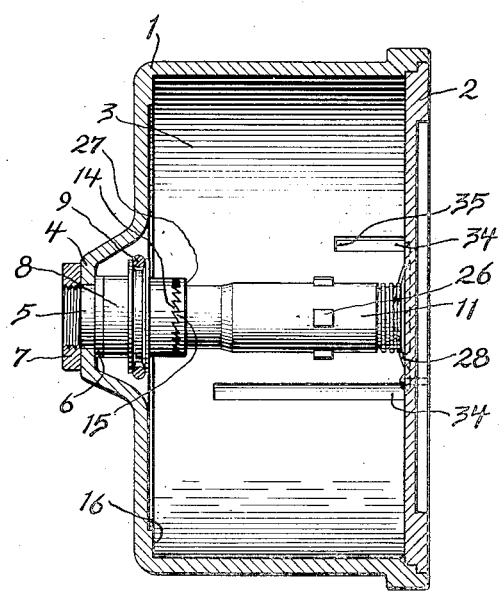
Figure 3 is a section taken on the line 3—3 of Fig. 1 with the magazines removed.

The internal surface of the wall portion 3 of the frame is provided with two spaced grooves 34 extending inwardly from the open side of the frame See Figs. 1 and 3. One of these grooves is relatively short and terminates abruptly at its inner end forming a stop 35. Each cup member 18 of the magazines is provided with a projection 36 adapted to engage either of the grooves 34, and these projections are disposed in the same relation with the film openings 33 of respective cup members. The projection 36 of the inner magazine is engaged in the longer groove 34 and is thus maintained against angular movement with the film opening 33 thereof properly positioned. The projection 36 of the outer magazine is engaged in the shorter groove 34 and is thus maintained against angular movement with the film opening 33 thereof properly positioned and offset from the film opening of the inner magazine. The stop 35 is adapted to be engaged by the projection 36, of a magazine, engaged in the shorter groove 34 to prevent movement of the magazine so positioned into the position of the inner magazine thus preventing movement of the magazines into the frame unless the projection 36 of the inner magazine is engaged in the longer groove 34. This insures the proper angular positions of the magazines in the frame though the magazines are identical and interchangeable.

While I have herein shown and particularly described the preferred embodiment of my invention I do not wish to be limited to the precise details of construction shown as changes may readily be made without departing from the spirit of my invention, but having thus described my invention, I claim as new and desire to secure by Letters Patent the following:—

1. A film magazine including two enclosure members detachably secured together and providing spaced parallel walls and provided with central alined openings in said walls and having coaxial cylindrical flanges on said walls surrounding said openings and extending inwardly toward each other with their adjacent ends spaced from each other, and a concentrically bored film spool between said walls and surrounding said flanges and rotatably mounted thereon and having an intermediately disposed, internal, and toothed concentric flange extending through the space between said flanges.

2. A film magazine including a circular sheet metal cup member, a circular flanged sheet metal cover having its flange detachably engaged with the lip of the cup member and forming an enclosure therewith, the parallel walls of said members having the metal thereof at their centers displaced to form central openings and having the metal so displaced formed into coaxial cylindrical flanges extending inwardly toward each other with their adjacent ends spaced, and a concentrically bored film spool between said walls and surrounding these cylindrical flanges and rotatably mounted thereon and having an intermediately disposed, internal, and toothed concentric flange extending through the space between said flanges.

3. The combination with a light tight film magazine of a film passage curved in one direction to provide a light trap and having the intermediate longitudinal portion of the inner wall surface thereof spaced farther from the outer wall surface thereof than the longitudinal edge portions of said inner wall surface and adapted for the free passage of film therethrough and communicating respectively at spaced points therealong with the enclosure of the magazine and with the exterior thereof for the feeding of film out of or into the magazine.

4. The combination with a light tight film magazine of a film passage curved in one direction to provide a light trap and having the intermediate longitudinal portion of the inner wall surface thereof spaced farther from the outer wall surface than the longitudinal edge portions of said inner wall surface and having end openings and an intermediate opening and adapted for the free passage of film into or out of the magazine by means of the intermediate opening and either one of the end openings.

5. The combination in a light tight film magazine comprising a cup shaped member forming a cylindrical wall provided with a film opening and a circular flanged cover member having its flange detachably engaged with the lip of the cup member, of a curved wall member extending in the direction around said cylindrical wall and across said film opening and provided with longitudinal flanges at its curved edges secured to said cylindrical wall to form a curved light tight film passage, with said cylindrical wall, communicating with said film opening and open at one end spaced from said opening to form an opposite film opening.

6. The combination in a light tight film magazine comprising a cup shaped member forming a cylindrical wall provided with a film opening and a circular flanged cover member having its flange detachably engaged with the lip of the cup member, of a curved wall member disposed on the inside of said cylindrical wall and extending in a direction around the internal surface thereof with said film opening at an intermediate point of said wall member and provided with longitudinal flanges at its curved edges secured to said cylindrical wall to form a curved light tight film passage, with said cylindrical wall, open at both ends.

7. The combination in a light tight film magazine comprising a cup shaped member forming a cylindrical wall provided with a film opening and a circular flanged cover member having its flange detachably engaged with the lip of the cup member, of a curved wall member disposed on the inside of said cylindrical wall and extending in a direction around the internal surface thereof and with said film opening at an intermediate point of said wall member and provided with longitudinal flanges at its curved edges secured to said cylindrical wall to form a curved tight film passage, with said cylindrical wall, open at both ends and adapted for the free passage of film into or out of the magazine by means of said film opening and either open end of said film passage, said curved wall member having the intermediate longitudinal portion thereof offset inwardly from the longitudinal edge portions thereof.

In witness whereof I hereunto affix my signature this 28th day of July, 1922.

ALBERT S. HOWELL.